United States Patent
Lee

(10) Patent No.: US 9,065,883 B2
(45) Date of Patent: Jun. 23, 2015

(54) APPARATUS AND METHOD FOR SETTING NETWORK ADDRESS IN PACKET COMMUNICATION SYSTEM

(75) Inventor: Kam-Rok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 12/994,812

(22) PCT Filed: Jun. 4, 2009

(86) PCT No.: PCT/KR2009/002983
§ 371 (c)(1),
(2), (4) Date: Nov. 26, 2010

(87) PCT Pub. No.: WO2009/148274
PCT Pub. Date: Dec. 10, 2009

(65) Prior Publication Data
US 2011/0075551 A1 Mar. 31, 2011

(30) Foreign Application Priority Data
Jun. 4, 2008 (KR) .................. 10-2008-0052394

(51) Int. Cl.
H04L 29/12 (2006.01)
H04L 29/06 (2006.01)

(52) U.S. Cl.
CPC ...... *H04L 61/6059* (2013.01); *H04L 29/12915* (2013.01); *H04L 29/12952* (2013.01); *H04L 61/6077* (2013.01); *H04L 69/16* (2013.01); *H04L 69/28* (2013.01); *H04L 69/163* (2013.01)

(58) Field of Classification Search
None
See application file for complete search history.

(56) References Cited

U.S. PATENT DOCUMENTS

| | | | | |
|---|---|---|---|---|
| 4,680,753 A * | 7/1987 | Fulton et al. | ................... | 370/449 |
| 5,903,559 A * | 5/1999 | Acharya et al. | ................ | 370/355 |
| 5,933,490 A * | 8/1999 | White et al. | ............. | 379/221.01 |
| 6,118,784 A * | 9/2000 | Tsuchiya et al. | ............... | 370/401 |
| 6,813,243 B1 | 11/2004 | Epps et al. | | |
| 6,968,553 B1 * | 11/2005 | Theeten | ......................... | 719/311 |
| 7,333,510 B1 * | 2/2008 | Hies et al. | ...................... | 370/467 |
| 7,716,370 B1 * | 5/2010 | Devarapalli | ................... | 709/245 |
| 7,746,858 B2 * | 6/2010 | Boers et al. | .................... | 370/390 |
| 7,769,017 B2 * | 8/2010 | Sylvain | ......................... | 709/227 |
| 8,166,126 B2 * | 4/2012 | Bristow et al. | ................. | 709/207 |

(Continued)

FOREIGN PATENT DOCUMENTS

KR 10-0776817 B1 8/2007

OTHER PUBLICATIONS

RD 466,106 "Automated re-connection for a network device which has no console device, during network configuration", disclosed by IBM Corp., published in the Feb. 2003.*

*Primary Examiner* — Ian N Moore
*Assistant Examiner* — Dung B Huynh
(74) *Attorney, Agent, or Firm* — Jefferson IP Law, LLP

(57) ABSTRACT

An apparatus and method for a connection method of a support sub-layer in a packet communication system are provided. In the method, whether a timeout occurs is determined while communication is performed with a destination node. When the timeout occurs, a first connection to the destination node is tried using a first address set having a highest priority in an address management table. When the first connection fails, a second connection to the destination node is tried in a pipeline manner on the basis of address sets inside the address management table. Valid address sets are generated via the second connection.

16 Claims, 9 Drawing Sheets

(56) References Cited

U.S. PATENT DOCUMENTS

| | | |
|---|---|---|
| 2003/0005100 A1* | 1/2003 | Barnard et al. ............... 709/223 |
| 2003/0061376 A1* | 3/2003 | Li et al. ......................... 709/238 |
| 2003/0088701 A1* | 5/2003 | Mross .......................... 709/245 |
| 2004/0015728 A1* | 1/2004 | Cole et al. ..................... 713/201 |
| 2004/0037297 A1* | 2/2004 | Ishida et al. ............. 370/395.54 |
| 2004/0059822 A1* | 3/2004 | Jiang et al. ................... 709/230 |
| 2004/0143579 A1* | 7/2004 | Nakazawa ....................... 707/10 |
| 2004/0221207 A1* | 11/2004 | Yokota et al. .................. 714/48 |
| 2005/0002339 A1* | 1/2005 | Patil et al. ..................... 370/237 |
| 2005/0050148 A1* | 3/2005 | Mohammadioun et al. .. 709/206 |
| 2005/0220094 A1 | 10/2005 | Parker et al. |
| 2006/0018301 A1* | 1/2006 | Schrufer ....................... 370/351 |
| 2006/0056386 A1* | 3/2006 | Stogel .......................... 370/351 |
| 2007/0011326 A1* | 1/2007 | Ohara ........................... 709/225 |
| 2007/0025270 A1 | 2/2007 | Sylvain |
| 2007/0154005 A1* | 7/2007 | Daigle .................... 379/211.04 |
| 2008/0069137 A1* | 3/2008 | Jimmei .......................... 370/466 |
| 2009/0006648 A1* | 1/2009 | Gopalakrishnan et al. ... 709/245 |
| 2009/0080335 A1* | 3/2009 | Siminoff ....................... 370/241 |
| 2009/0216497 A1* | 8/2009 | Schwiers et al. ............... 702/188 |
| 2010/0115106 A1* | 5/2010 | Moriwaki et al. ............ 709/227 |
| 2013/0016628 A1* | 1/2013 | Bertani et al. ................ 370/255 |

* cited by examiner

APPARATUS AND METHOD FOR SETTING NETWORK ADDRESS IN PACKET COMMUNICATION SYSTEM

TECHNICAL FIELD

The present invention relates generally to an apparatus and a method for performing communication without stoppage using a different Internet Protocol version 6 (IPv6) address when connection using an IPv6 address fails in a communication apparatus which may use IPv6.

BACKGROUND ART

Unlike IPv4, in IPv6, one interface or each of a plurality of interfaces may have multiple IPv6 addresses. Also, a plurality of destination IPv6 addresses included in a Domain Name System (DNS) name query response message may be provided.

Unlike an IPv4 address system, since there exist a plurality of transmission IPv6 addresses at one node, and a plurality of destination IPv6 addresses at one node, there exist a problem of having to select a suitable transmission IPv6 address and a suitable destination IPv6 address for communication between a transmission node and a destination node.

To address this problem, Internet Engineering Task Force (IETF) suggests a transmission and destination address selection algorithm through a document Request For Comments (RFC) 3484.

The transmission and destination address selection algorithm of RFC 3484 uses following information in order to determine a couple of a transmission address and a destination address when there exit a plurality of transmission addresses and destination addresses.

First, an address range is classified into link-local, site-local, and global. An address state is classified into deprecated or not, and reachable or not. An address use purpose is classified into temporary or not. As an address prefix, a longest matching prefix is preferentially selected.

A high address precedence is preferentially selected. Regarding a label value, an address having the same label value is preferentially selected.

FIG. 1 illustrates a communication structure in a general IPv6 network.

Referring to FIG. 1, a transmission host 110 has following addresses.

| LAN interface of transmission host |
| --- |
| 3ffe:ffff:21a5:a454:2aa:ff:fe21:5c2f(global address, non-deprecated state, public use) |
| 3ffe:ffff:21a5:a454:20da:3198:2c50:1a57(global address, non-deprecated state, temporary use) |
| 3ffe:ffff:21a5:a454:1d15:9c:8e4c:902b(global address, deprecated state, temporary use) |
| fec0:3a4f:78ea:a454:2aa:ff:fe21:5c2f (site-local address, non-deprecated state) |
| fe80::2aa:ff:fe21:5c2f(link-local address, non-deprecated state) |
| 157.60.17.211 (public IPv4 address [global scope], non-deprecated state) |

| Automatic tunneling pseudo-interface |
| --- |
| 3ffe:ffff:21a5:a499::5efe:157.60.17.211 (global ISATAP address, non-deprecated state) |
| fe80::5efe:157.60.17.211 (link-local address, non-deprecated state) |

In this case, for communication with a destination host 130, the transmission host 110 transmits a "DNS name query request" message to a DNS server 120 in order to determine the address of the destination host 130. The DNS server 120 responds following destination addresses using a "DNS name query response" message.

| |
| --- |
| 207.73.118.98 (public IPv4 address [global scope]) |
| 3ffe:ffff:21a5:a4ca:2aa:ff:fe35:2c1a (global address) |
| 3ffe:ffff:21a5:a499::5efe:207.73.118.98 (ISATAP global address) |
| fec0:3a4f:2a34:1aa7:2aa:ff:fe35:2c1a (site-local address) |

The transmission and destination address selection algorithm determines a following transmission-destination address couple with respect to the above transmission addresses and destination addresses.

| transmission address | destination address |
| --- | --- |
| fec0:3a4f:78ea:a454:2aa:ff:fe21:5c2f | fec0:3a4f:2a34:1aa7:2aa:ff:fe35:2c1a |
| 3ffe:ffff:21a5:a454:2aa:ff:fe21:5c2f | 3ffe:ffff:21a5:a4ca:2aa:ff:fe35:2c1a |
| 3ffe:ffff:21a5:a499::5efe:157.60.17.211 | 3ffe:ffff:21a5:a499::5efe:207.73.118.98 |
| 157.60.17.211 | 207.73.118.98 |

After that, the transmission host 110 and the destination host 130 communicate with each other using the above-determined address couple.

In FIG. 1, in the case where an address couple determined by the transmission and destination address selection algorithm is used, when communication using a first address couple fails, communication may be tried by a frequency of retransmission designated by Transmission Control Protocol (TCP)/User Datagram Protocol (UDP)/Internal Protocol (IP). When all communication fails although communication is tried by the frequency of the retransmission, communication is tried using the next address couple.

However, generally, during an Internet access, when an access fails by a maximum frequency of retransmission, an Internet access failure occurs and an Internet access using the next address couple is not tried.

Also, even though the next address couple may be used when an Internet access using the first address pair fails in FIG. 1, TCP/UDP/IP communication requires a long delay time until the next address couple is used. That is, a delay time as much as the maximum frequency of retransmission using the first address couple occurs.

Therefore, even when there exist useful addresses among transmission addresses not selected by the transmission and destination address selection algorithm, they are not used.

FIG. 2 illustrates an example of an operation of a general transmission and destination address selection algorithm.

Referring to FIG. 2, a host A (210) supports IPv6 and IPv4, and has an IPv6 global address, and an Intra-Site Automatic Tunnel Addressing Protocol (ISATAP) global address which allows an IPv6 address to transition to an IPv4 address via an ISATAP interface. Also, a host B (260) has a global address of IPv6.

A router 230 which connects the host A (210) with the host B (260) has two Network Interface Cards (NICs). An NIC1 supports ISATAP and IPv6, and an NIC2 supports IPv6.

Therefore, an IPv6/IPv4 network 200 may be used as a network between the host A (210) and the NIC1. That is, the host A (210) may transfer a packet to the host B (260) via the IPv6/IPv4 network 200 using an IPv6 address.

Also, the host A (210) may transfer an IPv6 packet encapsulated using IPv4 to the host B (260) by transmitting the IPv6 packet encapsulated using IPv4 through the IPv4 network 200 using the ISATAP interface of the router 230 which uses an IPv6 address.

An exemplary embodiment of the present invention assumes that the host A (210) and the host B (260) have the following address information.

| Host A |
| --- |
| 2001:1:2:0:200:f0ff:fe7a:5214 (global address, non-deprecated, public use) |
| 2001:DB8:0:7:0:5cfc:192.168.1.10 (global ISATAP address, non-deprecated) |
| Host B |
| 2001:3:4:5:1966:b2f1:475c:940c (global address, non-deprecated, public use) |

Also, an exemplary embodiment of the present invention assumes that the host B (260) is operated as an Internet Information Service (IIS) server, and the host A (210) is connected to the host B (260) via an Internet web browser. Also, an exemplary embodiment of the present invention assumes that it has been confirmed that all addresses of the host A (210) and the host B (260) are valid addresses as a result of a ping test.

At this point, the address of the host A (210) is determined as "2001:1:2:0:200:f0ff:fe7a:5214" by the transmission and destination address selection algorithm. After that, communication using a transmission address (2001:1:2:0:200:f0ff:fe7a:5214) and a destination address (2001:3:4:5:1966:b2f1:475c:940c) is performed. A communication process is described below.

First, the host A (210) performs a connection to the host B (260). Also, during connection, the router 230 removes an IPv6 function at the NIC1 and leaves only the ISATAP router function. This is for realizing a failure of an IPv6 network.

After that, the host A (210) experiences a connection failure to the host B (260) (connection failure after connection is tried by a frequency of retransmission designated by TCP/UDP/IP).

After that, the host A (210) tries a connection to the host B (260) using the transmission and destination address selection algorithm, but the connection fails because the host A (210) tries a connection by selecting "2001:1:2:0:200:f0ff:fe7a:5214" as a transmission address.

As described in the above example, since "2001:1:2:0:200:f0ff:fe7a:5214" is non-deprecated, "2001:1:2:0:200:f0ff:fe7a:5214" is selected continuously by the transmission and destination address selection algorithm even though a connection fails.

In this case, if an ISATAP address (2001:DB8:0:7:0:5efe:192.168.1.10) were selected during a connection failure, connection would be performed successfully.

Consequently, when the transmission and destination address selection algorithm defined by the document RFC 3484 is used, a long transmission delay time due to a connection failure, and an inefficient address access may be generated.

DISCLOSURE OF INVENTION

Technical Solution

An aspect of the present invention is to address at least the above-mentioned problems and/or disadvantages and to provide at least the advantages described below.

Accordingly an aspect of the present invention is to provide an apparatus and a method for setting a network address in a packet communication system.

Another aspect of the present invention is to provide an apparatus and a method for a support sub-layer, which may support TCP/UDP/IP and select a valid address from addresses not selected by a basic address selection algorithm.

Still another aspect of the present invention is to provide an apparatus and a method for addressing long delay time generated by retransmission when a connection fails, and maintaining an existing session.

According to an aspect of exemplary embodiments of the present invention, a connection method of a support sub-layer in a packet communication system is provided. The method includes: trying a first connection to a destination node using a first address set having a highest priority in an address management table; when the first connection fails, trying a second connection to the destination node in a pipeline manner on the basis of address sets inside the address management table; and generating valid address sets via the second connection.

According to another aspect of exemplary embodiments of the present invention, a connection method of a support sub-layer in a packet communication system is provided. The method includes: determining whether a timeout occurs while performing communication with a destination node; when the timeout occurs, trying a first connection to the destination node using a first address set having a highest priority in an address management table; when the first connection fails, trying a second connection to the destination node in a pipeline manner on the basis of address sets inside the address management table; and generating valid address sets via the second connection.

According to still another aspect of exemplary embodiments of the present invention, an apparatus of a support sub-layer in a packet communication system is provided. The apparatus includes: a communication module for communicating with a destination node; a controller for trying a first connection to the destination node using a first address set having a highest priority in an address management table through the communication module, when the first connection fails, trying a second connection to the destination node in a pipeline manner using address sets inside the address management table, and generating valid address sets via the second connection; and a storing unit for storing the address management table.

According to yet another aspect of exemplary embodiments of the present invention, an apparatus of a support sub-layer in a packet communication system is provided. The apparatus includes: a communication module for communicating with a destination node; a controller for determining whether a timeout occurs while performing communication with the destination node through the communication module, when the timeout occurs, trying a first connection to the destination node using a first address set having a highest priority in an address management table, when the first connection fails, trying a second connection to the destination node in a pipeline manner using address sets inside the address management table, and generating valid address sets via the second connection; and a storing unit for storing the address management table.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other objects, features and advantages of certain exemplary embodiments of the present invention will be more apparent from the following description taken in conjunction with the accompanying drawings in which.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and a method for setting a network address in a packet communication system.

Figure 3:
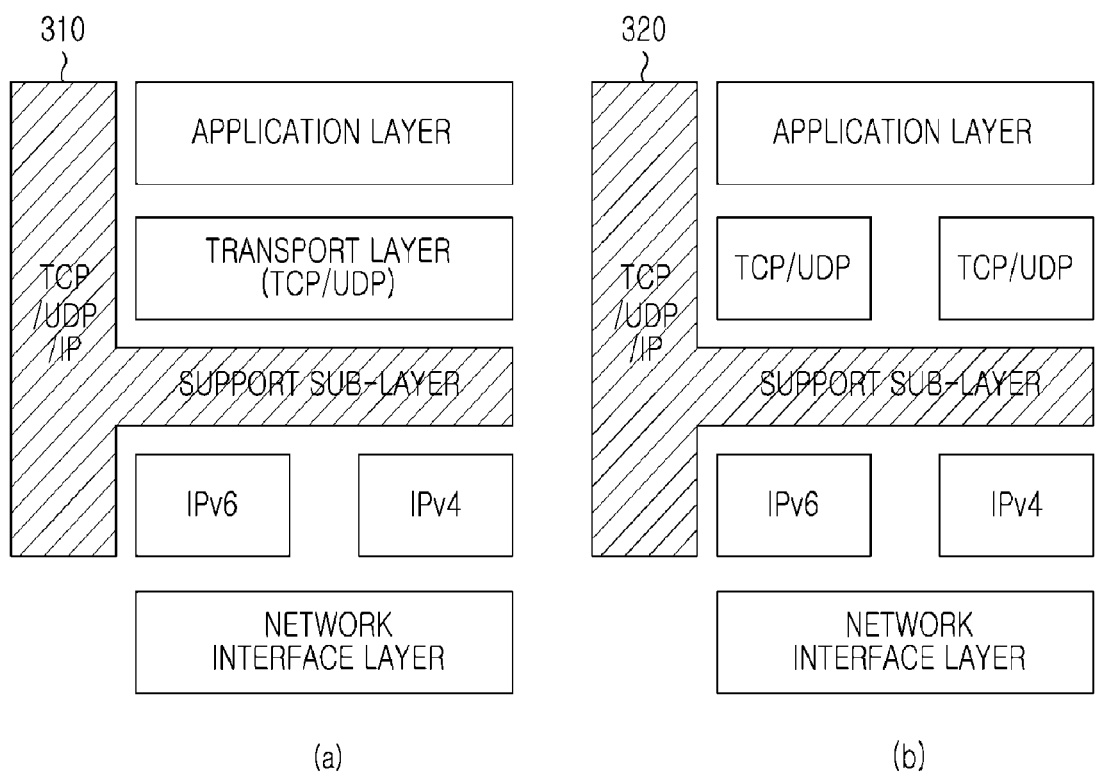
FIG. 3A is a view illustrating a dual IP layer in the structure of a TCP/UDP/IP support sub-layer according to an exemplary embodiment of the present invention.
FIG. 3B is a view illustrating a dual stack in the structure of a TCP/UDP/IP support sub-layer according to an exemplary embodiment of the present invention.

FIG. 3A is a view illustrating a dual IP layer in the structure of a TCP/UDP/IP support sub-layer according to an exemplary embodiment of the present invention, and FIG. 3B is a view illustrating a dual stack in the structure of a TCP/UDP/IP support sub-layer according to an exemplary embodiment of the present invention The structure of a TCP/UDP/IP support sub-layer (310/320) is located between a transport layer and a network layer of an Open System Interface (OSI) 7 layer.

FIG. 3A illustrates a dual IP layer (IPv6 and IPv4), and FIG. 3B illustrates a dual stack. The TCP/UDP/IP support sub-layers 310 and 320 may manage and maintain TCP/UDP/IP. The TCP/UDP/IP support sub-layer 310 and the TCP/UDP/IP support sub-layer 320 are identical to each other.

The TCP/UDP/IP support sub-layers 310 and 320 perform the following function.

First, the TCP/UDP/IP support sub-layers 310 and 320 manage and maintain addresses. The TCP/UDP/IP support sub-layers 310 and 320 manage and maintain addresses selected by an address selection algorithm defined in RFC 3484, and addresses not selected by the address selection algorithm. Also, the TCP/UDP/IP support sub-layers 310 and 320 use address management tables. To allow a valid address registered in the address management table to be selected when the address selection algorithm defined in RFC 3484 is executed, the TCP/UDP/IP support sub-layers 310 and 320 may change values such as precedence and an address state (for example, reachable-or-not) referred by the address selection algorithm when the address selection algorithm is executed. When data transmission using an address selected by the address selection algorithm of RFC 3484 fails, the precedence value of the relevant address is lowered. When the data transmission is successful, the precedence value of the relevant address is increased.

Also, when data transmission fails during a maximum frequency of retransmission defined by a TCP, an address state is changed (for example, unreachable, deprecated, etc.). When the address selection algorithm is executed again afterward, the address selection algorithm refers to the changed precedence value, address, and state information. Also, the address selection algorithm performs a pipeline-based efficient data transmission and valid address search function.

Figure 4:
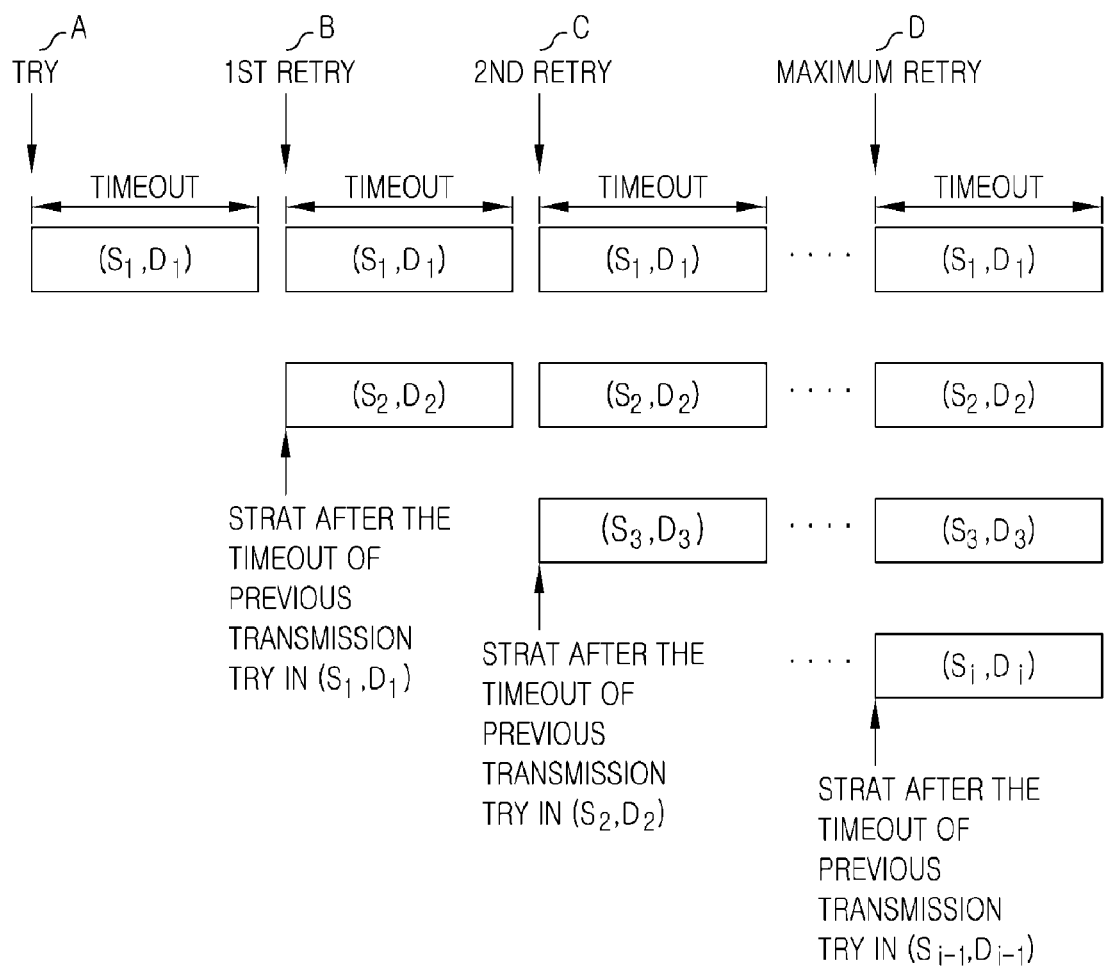
FIG. 4 is a view illustrating a pipeline-based address selection process according to an exemplary embodiment of the present invention.

FIG. 4 is a view illustrating a pipeline-based address selection process according to an exemplary embodiment of the present invention.

Referring to FIG. 4, a pipeline-based address selection function uses a maximum frequency of retransmission and a transmission timeout defined in a TCP, and uses an address set (Si, Di) determined by the address selection algorithm defined in RFC 3484.

First, a packet is transmitted using a first address set (S1, D1) determined by an upper layer. However, when there is no response during a timeout duration (step a), a packet is simultaneously transmitted using a second valid address set (S2, D2) in a pipeline manner during the next transmission (step b). In this case, the packet transmission using the first address set (S1, D1) is performed together.

Since there will exist a valid address set (Si, Di) within the maximum frequency of retransmission, when a previous address set (Si−1, Di−1) results in a transmission failure, simultaneous packet transmission is continuously performed in a pipeline manner. After that, a packet of transmitted packets which responds first is transferred to the upper layer. This is for fast transmission response.

Of address sets which have provided responses among all address sets transmitted during the same timeout duration, an address set having a highest priority is registered as a valid address set in an address management table. At this point, for a priority, an order determined by the address selection algorithm defined in RFC 3484 may be used.

For a valid address set (Si, Di) transmitted in a pipeline manner, an address set registered in the address management table may be used. Also, a determined valid address may be reflected to the address management table and an address swapping function which will be described later.

Figure 5:
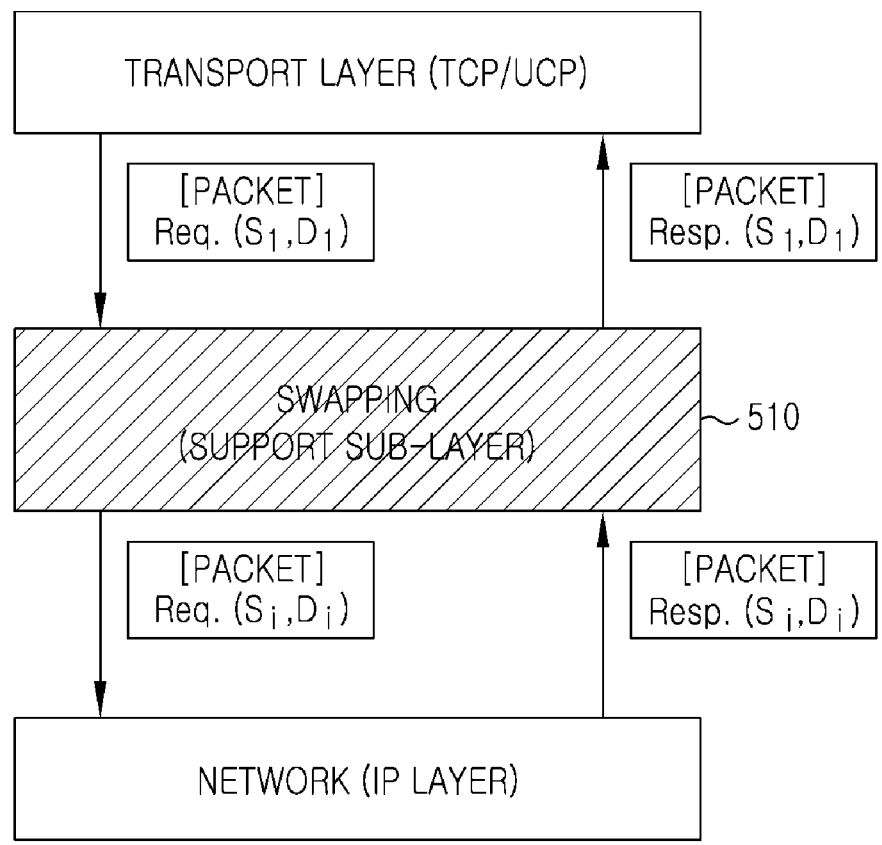
FIG. 5 is a view illustrating a structure for swapping in a support sub-layer according to an exemplary embodiment of the present invention.

FIG. 5 is a view illustrating a structure for swapping in a support sub-layer according to an exemplary embodiment of the present invention.

Referring to FIG. 5, when an address set (S1, D1) determined by an upper layer is different from a valid address set (Si, Di) which has been successful within a frequency of retransmission, a support sub-layer 510 provides a swapping function for the address set in order to maintain a session for an application of the upper layer.

When a packet is input from the upper layer, the support sub-layer 510 swaps an existing address set with a valid address set (Si, Di) and transfers the packet to the network layer until the upper layer terminates the opened session.

Also, when a response packet having a valid address set (Si, Di) is input from the network layer, the support sub-layer 510 swaps the address with the existing address set again, and transfers the packet to the upper layer.

By doing so, a session may be maintained. That is, generally, when a connection fails, a session is disconnected, but according to an exemplary embodiment of the present invention, a session may be maintained using an address swapping function.

Therefore, the support sub-layer 510 may provide a transparent packet transmission function between the transport layer and the network layer. Also, this function cooperates with a pipeline function to support an efficient packet transfer using session maintenance, packet delay time reduction, and packet transmission rate improvement.

Figure 6:
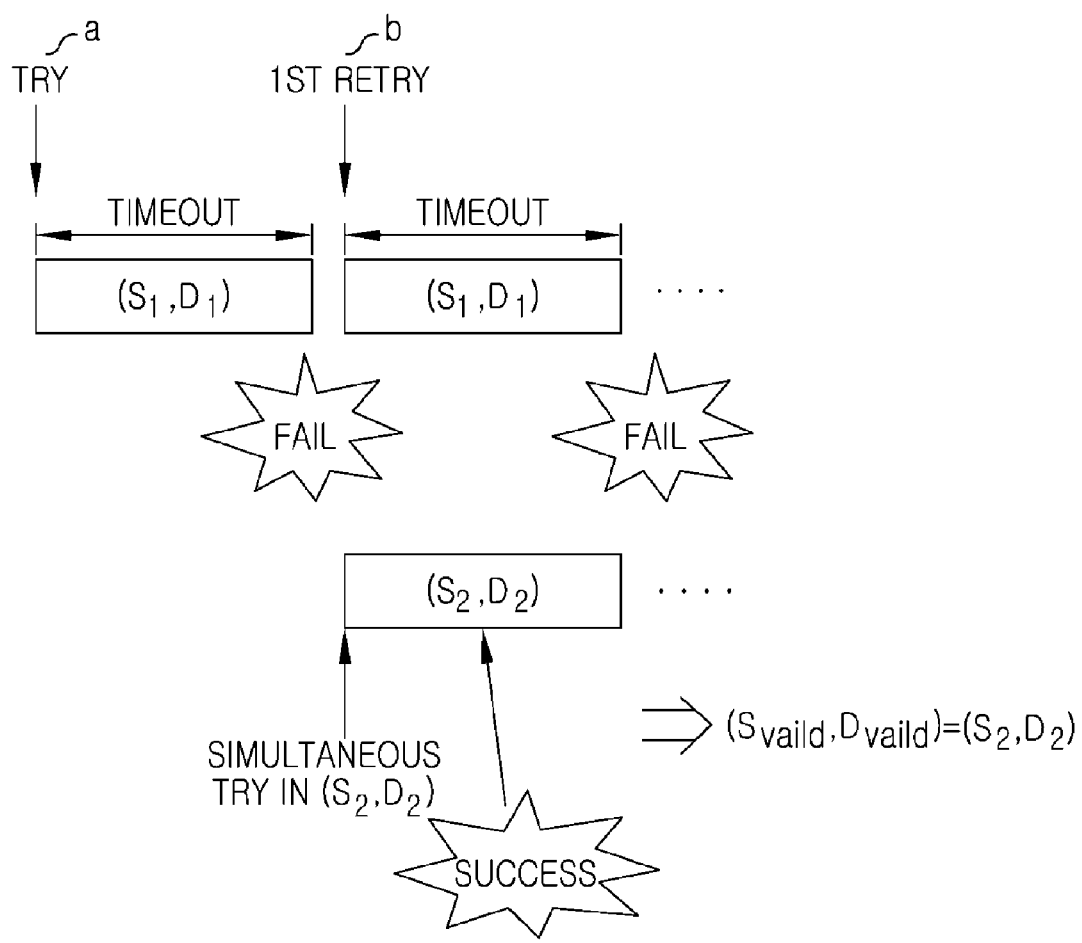
FIG. 6 is a view illustrating a pipeline-based packet transmission success process at a TCP/UDP/IP support sub-layer according to an exemplary embodiment of the present invention.

FIG. 6 is a view illustrating a pipeline-based packet transmission success process at a TCP/UDP/IP support sub-layer according to an exemplary embodiment of the present invention.

Referring to FIG. 6, first, in a first try (step a), a connection to an address (S1, D1) is tried. When the first try fails, in a second try after a first timeout, connections using the address (S1, D1) and an address (S2, D2) are simultaneously tried using a pipeline manner according to an exemplary embodiment of the present invention.

After that, when the connection tried using the address (S2, D2) is successful, the address set (S2, D2) becomes a valid address set.

When there exists a session connected using an existing address set (S1, D1), the address set (S1, D1) is swapped into the address set (S2, D2) by the TCP/UDP/IP support sub-layer. Also, an address management table is changed as in Table 1.

TABLE 1

| Priority Order | Transmission (Host A) | Destination (Host B) |
| --- | --- | --- |
| 1 | 2001:DB8:0:7:0:5efe:192.168.1.10 | 2001:3:4:5:1966:b2f1:475c:940c |
| 2 | 2001:1:2:0:200:f0ff:fe7a:5214 | 2001:3:4:5:1966:b2f1:475c:940c |

After that, a session to be newly connected may succeed by trying a connection using the address set (S1, D1) of Table 1 changed according to priority of an address management table.

Figure 7:
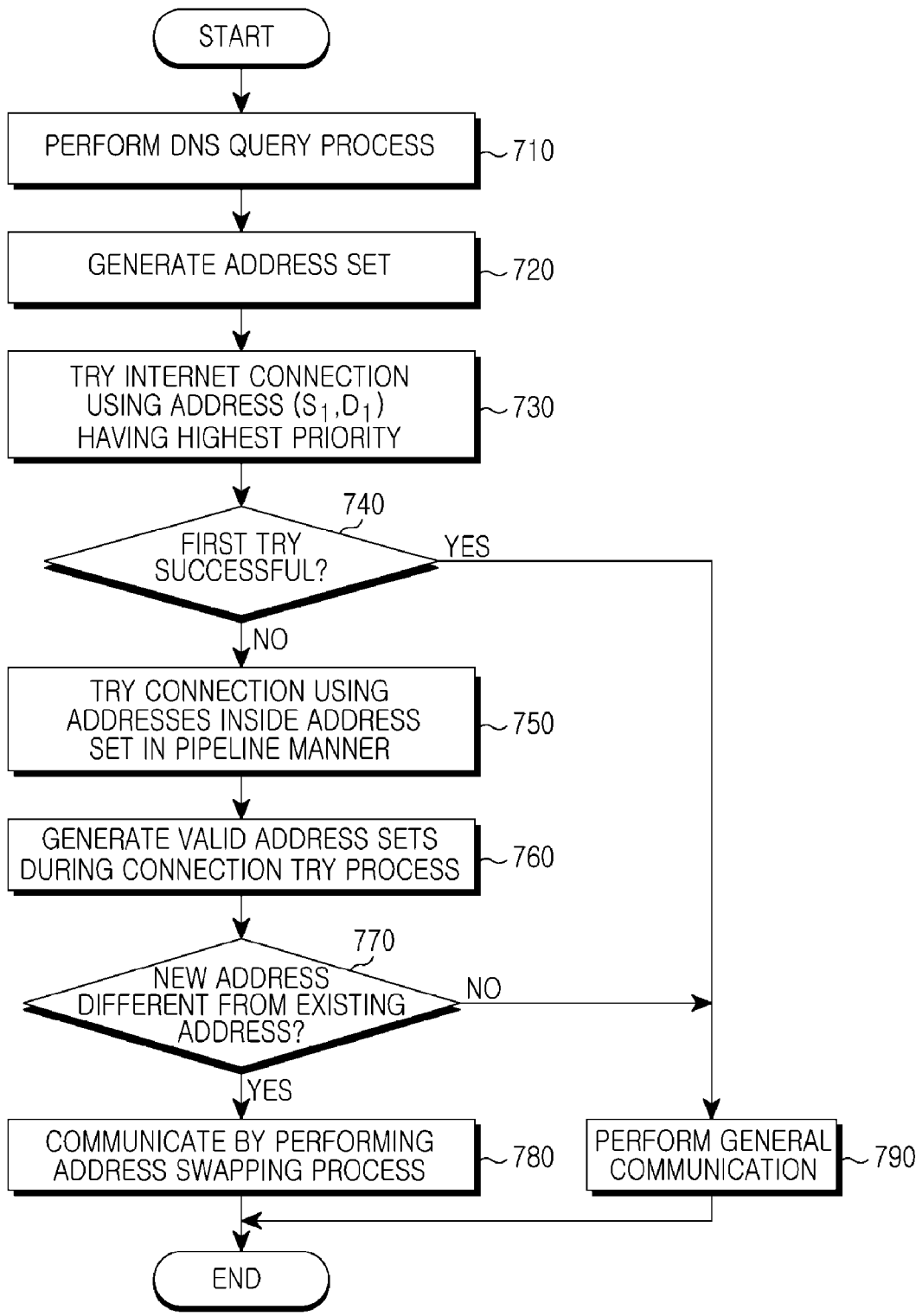
FIG. 7 is a flowchart illustrating an operation process when a transmission node performs a connection according to an exemplary embodiment of the present invention.

FIG. 7 is a flowchart illustrating an operation process when a transmission node performs a connection according to an exemplary embodiment of the present invention.

Referring to FIG. 7, in step 710, the transmission node performs a DNS query process in order to perform an initial connection. This process denotes a process in which the transmission node transmits a "DNS name query request" message to a DNS server in order to determine the address of a destination node, and determines the address of the destination node by receiving a "DNS name query response" message as a response. Here, in the case where an address system which is used is IPv6, the transmission node may determine a plurality of IP addresses.

In step 720, the transmission node generates address sets using the transmission and destination address selection algorithm defined in RFC 3484 with respect to a plurality of transmission addresses and destination addresses. Also, the transmission node registers the addresses in an address management table.

In step 730, the transmission node tries a connection to the destination node using an address set (S1, D1) having a highest priority of the address sets generated by the transmission and destination address selection algorithm.

When a TCP/UDP/IP support sub-layer fails in connection at a first connection try in step 740, the TCP/UDP/IP support sub-layer tries a second connection. During the second connection try, the TCP/UDP/IP support sub-layer tries a connection using an address set (S2, D2) having the next priority in a pipeline manner (step 750). When the TCP/UDP/IP support sub-layer fails in connection at the second connection try and there exists a valid address set, the TCP/UDP/IP support sub-layer retries a connection in a pipeline manner within a maximum frequency of TCP retransmission.

In step 760, during the retry process, the TCP/UDP/IP support sub-layer determines address sets having high priorities as valid address sets (Svalid, Dvalid) with respect to address sets which have provided successful responses among tried address sets. The TCP/UDP/IP support sub-layer provides a packet received via the valid address set (Svalid, Dvalid) to an upper layer.

At this point, when the valid address set (Svalid, Dvalid) is different from an address set (S1, D1) which has been used by the upper layer (step 770), the TCP/UDP/IP support sub-layer communicates using the above-described swapping function (step 780). After that, the TCP/UDP/IP support sub-layer updates reference variables (precedence value, label value, and address state) for the valid address set (Svalid, Dvalid), and registers the same in an address management table.

The swapping function denotes that in the case where the TCP/UDP/IP support sub-layer performs packet transmission/reception via a connected session, the TCP/UDP/IP support sub-layer swaps the address set (S1, D1) tried by the upper layer into the address set (Svalid, Dvalid), and transfers a packet to a network layer, and swaps an address set (Svalid, Dvalid) from the network layer into the address set (S1, D1) to perform packet transmission/reception. By doing so, transparent packet transmission/reception and session maintenance may be accomplished.

After a session terminates, when performing a new session connection during a normal operation, the TCP/UDP/IP support sub-layer may newly generate address sets by executing the transmission and destination address selection algorithm defined in RFC 3484 on the basis of changed address information.

When the TCP/UDP/IP support sub-layer succeeds in connection at a first connection try in step 740, or when the valid address set (Svalid, Dvalid) is the same as the address set (S1, D1) which has been used for a connection try by the upper layer in step 770, the TCP/UDP/IP support sub-layer performs general communication (step 790).

After that, the algorithm according to an exemplary embodiment of the present invention is ended.

Figure 8:
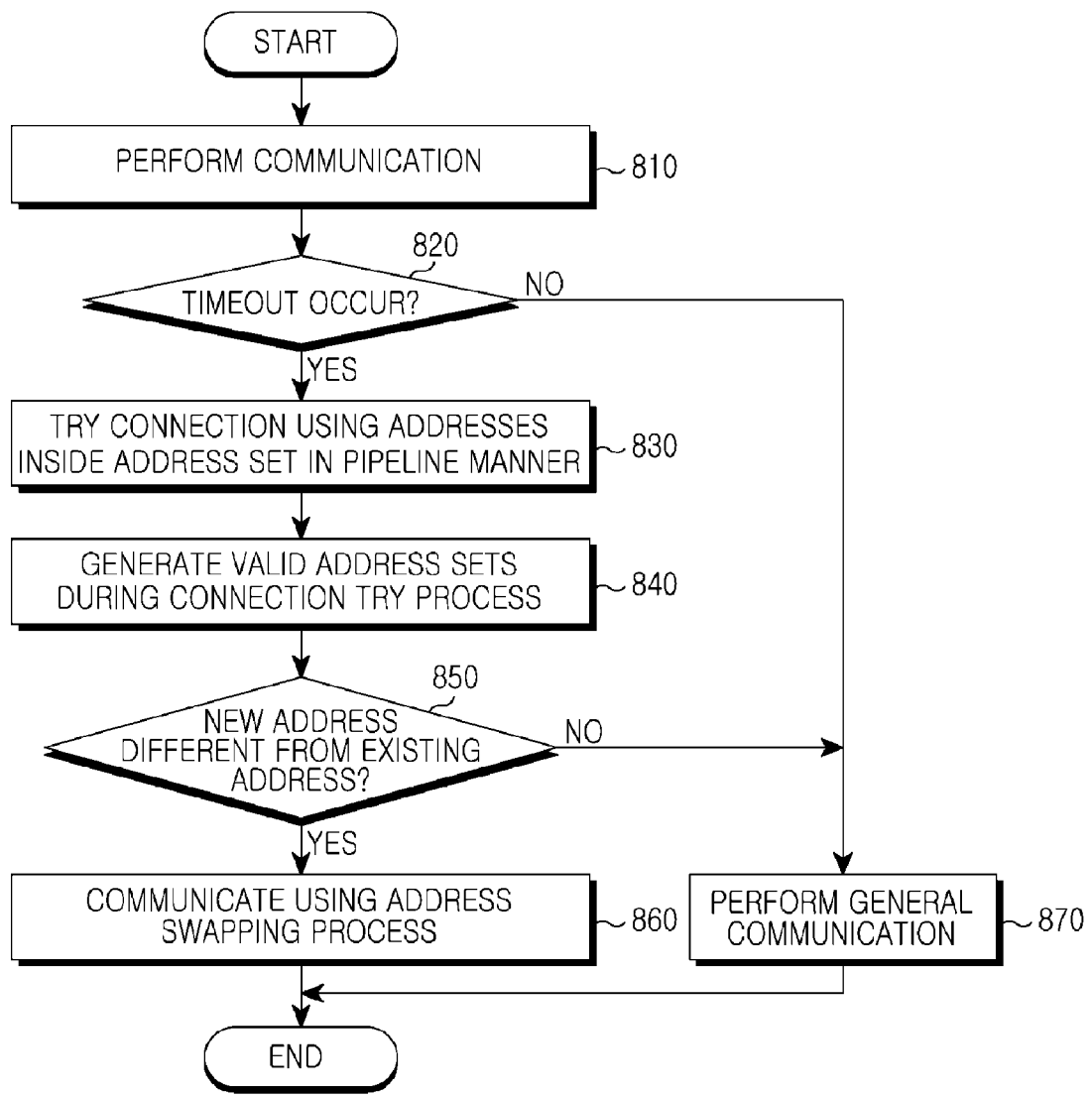
FIG. 8 is a flowchart illustrating an operation process when a transmission node performs communication according to an exemplary embodiment of the present invention.

FIG. 8 is a flowchart illustrating an operation process when a transmission node performs communication according to an exemplary embodiment of the present invention.

Referring to FIG. 8, in step 810, the transmission node is connected with a destination node using the process of FIG. 7, and then performs communication.

When timeout occurs during communication in step 820, a TCP/UDP/IP support sub-layer of the transmission node tries a connection using an address set (S2, D2) having the next priority in a pipeline manner (step 830). When timeout occurs and there exists a valid address set, the TCP/UDP/IP support sub-layer retries a connection in a pipeline manner within a maximum frequency of TCP retransmission.

In step 840, with respect to address sets which have provided successful responses among connection-tried address sets, the TCP/UDP/IP support sub-layer determines address sets having high priorities as valid address sets (Svalid, Dvalid).

At this point, when the valid address set (Svalid, Dvalid) is different from an address set (S1, D1) which has been used for a connection try by an upper layer in step 850, the TCP/UDP/IP support sub-layer communicates using a swapping function defined by the TCP/UDP/IP support sub-layer (step 860).

After that, the TCP/UDP/IP support sub-layer updates reference variables (precedence value, label value, and address state) for the valid address set (Svalid, Dvalid), and registers the same in an address management table.

The swapping function denotes that in the case where the TCP/UDP/IP support sub-layer performs packet transmission/reception via a connected session, the TCP/UDP/IP support sub-layer swaps the address set (S1, D1) tried by the upper layer into the address set (Svalid, Dvalid), and transfers a packet to a network layer, and swaps an address set (Svalid, Dvalid) from the network layer into the address set (S1, D1) to perform packet transmission/reception. By doing so, transparent packet transmission/reception and session maintenance may be accomplished.

After a session terminates, when performing a new session connection during a normal operation, the TCP/UDP/IP support sub-layer may newly generate address sets by executing the transmission and destination address selection algorithm defined in RFC 3484 on the basis of changed address information.

When the timeout does not occur in step 820, or when the valid address set (Svalid, Dvalid) is the same as the address set (S1, D1) which has been used for a connection try by the upper layer in step 850, the TCP/UDP/IP support sub-layer of the transmission node performs general communication (step 870).

After that, the algorithm according to an exemplary embodiment of the present invention is ended.

Of address sets generated in the address management table, only basically valid addresses become objects of the address management table, and address sets generated by the transmission and destination address selection algorithm defined in RFC 3484 may be preferentially registered in the address management table. Also, valid addresses having matching ranges (link-local or site-local or global) though they are not selected by the transmission and destination address selection algorithm defined in RFC 3484 are registered in the address management table. A related example is provided below.

In the case where transmission address={Sa, Sb, Sc, Sd}, destination address={Da, Db}, global address={Sa, Sb, Da} (priority: Sa>Sb), and site-local address={Sc, Sd, Db} (priority: Sc>Sd), address sets selected by the transmission and destination address selection algorithm become (Sc, Db) and (Sa, Da).

Here, a generated address management table is given as in Table 2.

TABLE 2

| Priority Order | Transmission | Destination |
| --- | --- | --- |
| 1 | Sc | Db |
| 2 | Sa | Da |
| 3 | Sd | Db |
| 4 | Sb | Da |

Assuming that (Si, Di) is an address set of Table 2, i is a priority number. That is, address sets become (S1, D1), (S2, D2), (S3, D3), and (S4, D4).

Figure 1:
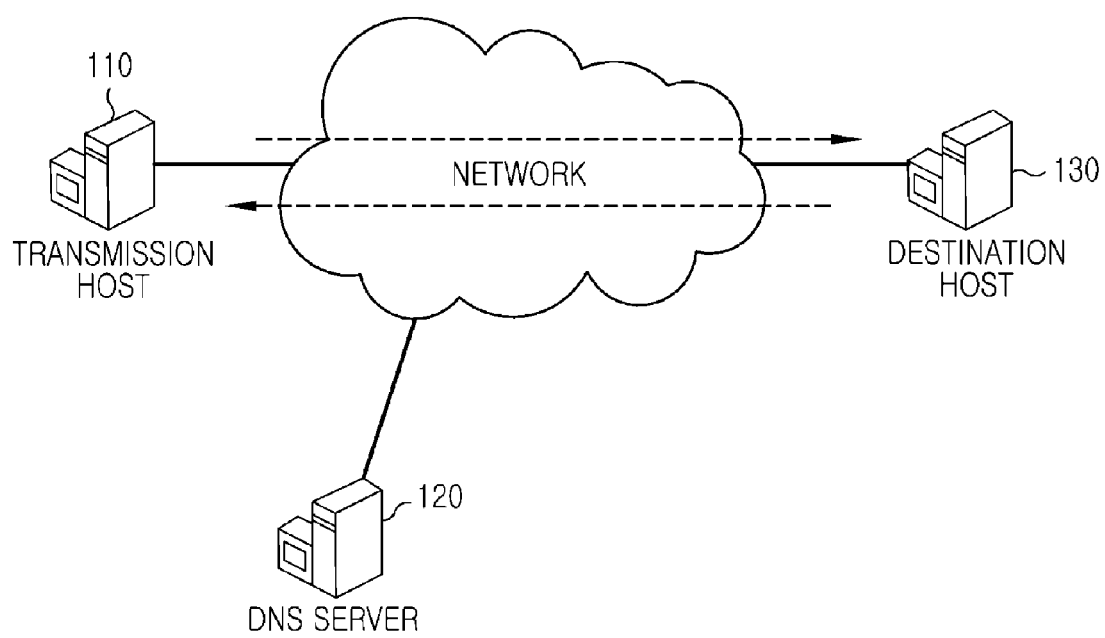
FIG. 1 is a view illustrating a communication structure in a general IPv6 network.
Figure 2:
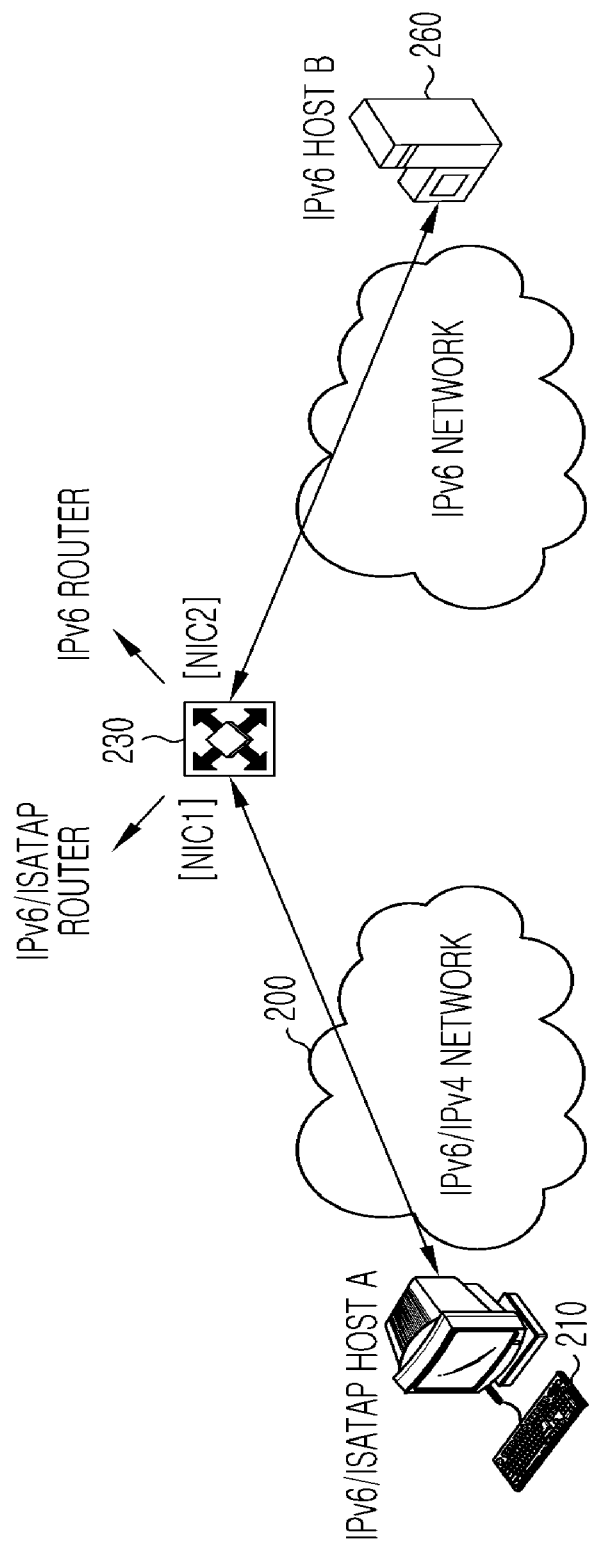
FIG. 2 is a view illustrating an example of an operation of a general transmission and destination address selection algorithm.

A case where the function of the TCP/UDP/IP support sub-layer according to an exemplary embodiment of the present invention is applied to the case of FIG. 2 is described below.

When the TCP/UDP/IP support sub-layer is applied to FIG. 2, an address management table is generated as in Table 3.

TABLE 3

| Priority Order | Transmission (Host A) | Destination (Host B) |
| --- | --- | --- |
| 1 | 2001:1:2:0:200:f0ff:fe7a:5214 | 2001:3:4:5:1966:b2f1:475c:940c |
| 2 | 2001:DB8:0:7:0:5efe:192.168.1.10 | 2001:3:4:5:1966:b2f1:475c:940c |

When the TCP/UDP/IP support sub-layer is applied to the same test scenario applied to FIG. 2, a connection try operates as in FIG. 6 by a method using the pipeline of FIG. 4.

Figure 9:
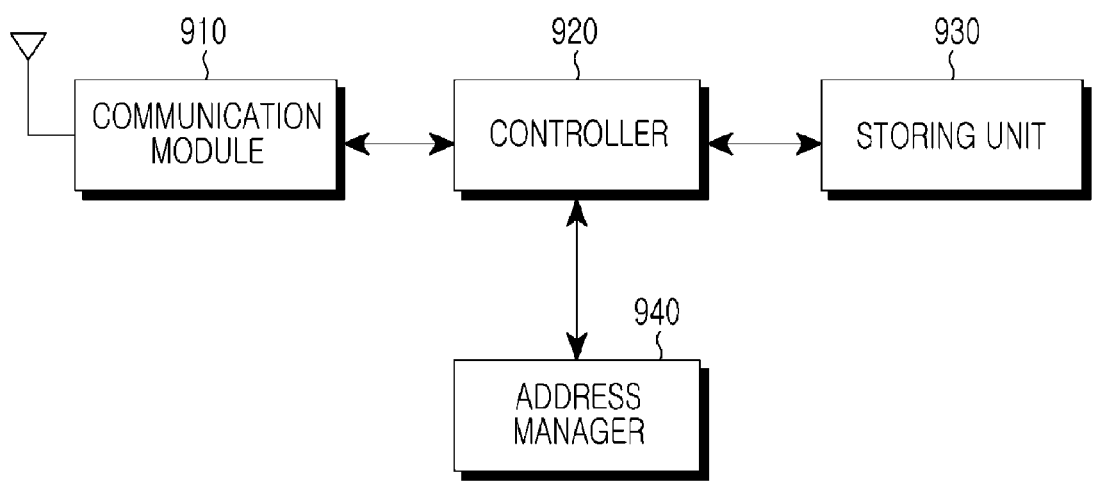
FIG. 9 is a block diagram illustrating an apparatus according to an exemplary embodiment of the present invention.

FIG. 9 is a block diagram illustrating an apparatus according to an exemplary embodiment of the present invention.

Referring to FIG. 9, the apparatus includes a communication module 910, a controller 920, a storing unit 930, and an address manager 940.

The communication module 910 serves as a module for communicating with a different node, particularly, a destination node. In the case where the apparatus uses wireless communication, the communication module 910 includes a Radio Frequency (RF) processor and an RF baseband processor. The RF processor converts a signal received via an antenna to a baseband signal and provides the baseband signal to the RF baseband processor. Also, the RF processor converts a baseband signal from the baseband processor to an RF signal so that the RF signal may be transmitted on an actual RF path, and transmits the RF signal via the antenna.

In the case where the apparatus uses wired communication, the communication module 910 includes a wired processor and a wired baseband processor. The wired processor converts a signal received via a wired path to a baseband signal and provides the baseband signal to the wired baseband processor. Also, the wired processor converts a signal from the wired baseband processor to a wired signal so that the wired signal may be transmitted on an actual wired path, and transmits the wired signal via the wired path.

The controller 920 controls an overall operation of the apparatus. Particularly, the controller 920 controls the address manager 940 according to an exemplary embodiment of the present invention.

The storing unit 930 stores a program for controlling an overall operation of the apparatus, and temporary data generated while a program is executed. Particularly, the storing unit 930 stores an address management table according to an exemplary embodiment of the present invention.

The address manager 940 performs the above-described function of the TCP/UDP/IP support sub-layer. Though not shown, the rest of layers may exist separately, or the controller 920 may perform all or some of functions of the rest of the layers.

The address manager 940 performs the following function during connection.

The address manager 940 performs a DNS query process in order to perform an initial connection. Also, the transmission node generates address sets using the transmission and destination address selection algorithm defined in RFC 3484 with respect to a plurality of transmission addresses and destination addresses, and registers the addresses in an address management table.

The address manager 940 tries a connection using an address set (S1, D1) having a highest priority among address sets generated by the transmission and destination address selection algorithm. When a first connection try fails, the address manager 940 tries a second connection. During the second connection try, the address manager 940 tries a connection using an address set (S2, D2) having the next priority in a pipeline manner. When the second connection try fails and there exists a valid address set, the address manager 940 retries a connection in a pipeline manner within a maximum frequency of TCP retransmission.

During the retry process, the address manager 940 determines address sets having high priorities as valid address sets (Svalid, Dvalid) with respect to address sets which have provided successful responses among tried address sets. Also, the address manager 940 provides a packet received via the valid address set (Svalid, Dvalid) to an upper layer.

At this point, when the valid address set (Svalid, Dvalid) is different from the address set (S1, D1) which has been used for a connection try by the upper layer, the address manager 940 communicates using the above-described swapping function, updates reference variables (precedence value, label value, and address state) for the valid address set (Svalid, Dvalid), and registers the same in the address management table.

After a session terminates, when opening a new session and trying a connection during a normal operation, the address manager 940 may newly generate address sets by executing the transmission and destination address selection algorithm defined in RFC 3484 on the basis of changed address information.

When the address manager 940 succeeds in connection at a first connection try, or when the valid address set (Svalid, Dvalid) is the same as the address set (S1, D1) which has been used for a connection try by the upper layer, the address manager 940 performs general communication.

The address manager 940 performs the following function during communication.

When timeout occurs during communication, the address manager 940 tries a connection using an address set (S2, D2) having the next priority in a pipeline manner. When the timeout occurs and there exists a valid address, the address manager 940 retries a connection in a pipeline manner within a maximum frequency of TCP retransmission.

The address manager 940 determines address sets having high priorities as valid address sets (Svalid, Dvalid) with respect to address sets which have provided successful responses among connection-tried address sets. At this point, when the valid address set (Svalid, Dvalid) is different from the address set (S1, D1) which has been used for a connection try by the upper layer, the address manager 940 communicates using the defined swapping function.

The address manager 940 updates reference variables (precedence value, label value, and address state) for the valid address set (Svalid, Dvalid), and registers the same in the address management table.

After a session terminates, when opening a new session and trying a connection during a normal operation, the address manager 940 may newly generate address sets by executing the transmission and destination address selection algorithm defined in RFC 3484 on the basis of changed address information.

When the timeout does not occur, or when the valid address set (Svalid, Dvalid) is the same as the address set (S1, D1) which has been used for a connection try by the upper layer, the address manger 940 performs general communication.

In the above-described block diagram, the controller 920 may perform the function of the address manager 940. Separate configuration and illustration of the address manager 940 in an exemplary embodiment of the present invention is for separately describing each function.

Therefore, in actual realization of a product, all or some of the functions of the address manager 940 may be processed by the controller 920.

An exemplary embodiment of the present invention may a long transmission delay time generated due to retransmission when connection fails, increase a packet transmission rate by improving connection ability through valid address management and efficient address access, and maintain a session.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

The invention claimed is:

1. A connection method of a support sub-layer in a packet communication system, the method comprising:
   receiving a single address set list for a connection to a destination node, wherein the address set list includes address sets stored in an address management table;
   attempting a first connection to the destination node using a first address set in the address set list, wherein the first address set has a highest priority in an address management table;
   when an initial attempt of the first connection fails, attempting a second connection to the destination node using a second address set in the address set list stored in the address management table; and
   generating valid address sets via the second connection,
   wherein a second attempt of the first connection occurs concurrently with an initial attempt of the second connection, and
   wherein the first address set comprises a first transmission address and a first destination address and the second address set comprises a second transmission address and a second destination address.

2. The method of claim 1, further comprising performing communication with the destination node using a second address set having a highest priority in the valid address sets.

3. The method of claim 2, further comprising:
   when the second address set is different from the first address set and a packet comprising the first address set is input from an upper layer, changing the first address set included in the packet to the second address set; and
   transferring the changed packet to a lower layer.

4. The method of claim 2, further comprising:
   when the second address set is different from the first address set and a packet comprising the second address set is input from a lower layer, changing the second address set included in the packet to the first address set; and
   transferring the changed packet to an upper layer.

5. The method of claim 1, further comprising performing update by storing the valid address sets in the address management table according to a priority.

6. A connection method of a support sub-layer in a packet communication system, the method comprising:
   receiving a single address set list for a connection to a destination node, wherein the address set list includes address sets stored in an address management table;
   connecting to the destination node and communicating with the destination node;
   determining whether a timeout occurs while performing the communication with the destination node;
   when the timeout occurs, attempting a first connection to the destination node using a first address set in the address set list having a highest priority in the address management table;
   when an initial attempt of the first connection fails, attempting a second connection to the destination node using a second address set in the address set list stored in the address management table; and
   generating valid address sets via the second connection,
   wherein a second attempt of the first connection occurs concurrently with an initial attempt of the second connection, and
   wherein the first address set comprises a first transmission address and a first destination address and the second address set comprises a second transmission address and a second destination address.

7. The method of claim 6, further comprising performing communication with the destination node using a second address set having a highest priority in the valid address sets.

8. The method of claim 6, further comprising performing update by storing the valid address sets in the address management table according to a priority.

9. An apparatus of a support sub-layer in a packet communication system, the apparatus comprising:
   a communication module for communicating with a destination node and receiving a single address set list for a connection to the destination node, wherein the address set list includes address sets stored in an address management table;
   a controller for attempting a first connection to the destination node using a first address set in the address set list having a highest priority in the address management table through the communication module, when an initial attempt of the first connection fails, attempting a second connection to the destination node using a second address set in the address set list stored in the address management table, and generating valid address sets via the second connection; and
   a storing unit for storing the address management table,
   wherein a second attempt of the first connection occurs concurrently with an initial attempt of the second connection, and
   wherein the first address set comprises a first transmission address and a first destination address and the second address set comprises a second transmission address and a second destination address.

10. The apparatus of claim 9, wherein the controller performs communication with the destination node using a second address set having a highest priority in the valid address sets.

11. The apparatus of claim 10, wherein when the second address set is different from the first address set and when receiving a packet comprising the first address set from an upper layer, the controller changes the first address set included in the packet to the second address set, and transfers the changed packet to a lower layer.

12. The apparatus of claim 10, wherein when the second address set is different from the first address set and when receiving a packet comprising the second address set from a lower layer, the controller changes the second address set included in the packet to the first address set, and transfers the changed packet to an upper layer.

13. The apparatus of claim 9, wherein the controller performs update by storing the valid address sets in the address management table according to a priority.

14. An apparatus of a support sub-layer in a packet communication system, the apparatus comprising:
   a communication module for communicating with a destination node and receiving a single address set list for a connection to the destination node, wherein the address set list includes address sets stored in an address management table;
   a controller for determining whether a timeout occurs while performing communication with the destination node through the communication module, when the timeout occurs, attempting a first connection to the destination node using a first address set in the address set list having a highest priority in the address management table, when an initial attempt of the first connection fails, attempting a second connection to the destination node using a second address set in the address set list stored in the address management table, and generating valid address sets via the second connection; and a storing unit for storing the address management table, wherein a second attempt of the first connection occurs concurrently with an initial attempt of the second connection, and wherein the first address set comprises a first transmission address and a first destination address and the second address set comprises a second transmission address and a second destination address.

15. The apparatus of claim 14, wherein the controller performs communication with the destination node using a second address set having a highest priority in the valid address sets.

16. The apparatus of claim 14, wherein the controller performs update by storing the valid address sets in the address management table according to a priority.

* * * * *